April 21, 1959 — R. B. GOODRUM — 2,883,201
UNIVERSAL CHUCK
Filed May 14, 1958 — 3 Sheets-Sheet 1

Inventor
Richard B. Goodrum
By Sughrue and Rothwell
Attys.

April 21, 1959  R. B. GOODRUM  2,883,201
UNIVERSAL CHUCK
Filed May 14, 1958  3 Sheets-Sheet 2

Inventor
Richard B. Goodrum
By Sughrue and Rothwell
Attys.

April 21, 1959　　　R. B. GOODRUM　　　2,883,201
UNIVERSAL CHUCK

Filed May 14, 1958　　　　　　　　　　　　　　3 Sheets-Sheet 3

Inventor
Richard B. Goodrum
By Sughrue and Rothwell
Attys.

United States Patent Office 2,883,201
Patented Apr. 21, 1959

2,883,201

UNIVERSAL CHUCK

Richard B. Goodrum, Springfield, Vt., assignor to Jones and Lamson Machine Company, a corporation of Vermont Application May 14, 1958, Serial No. 735,214

6 Claims. (Cl. 279—113)

This invention relates to a universal chuck and more particularly to a multi-jawed universal chuck having means for adjusting any one of the jaws independently of the other jaws.

Universal multi-jawed chucks are chucks of the type having a plurality of jaws movably mounted in a chuck body and an actuator for simultaneously moving all of the jaws together. Often, when a rough workpiece having an unfinished outside configuration is clamped within a chuck of this type it is not properly centered and it is therefore necessary to make an adjustment in the relative position of one or more of the jaws of the chuck with respect to the other jaws.

It is a principal object of this invention to provide a mechanism for individually adjusting the position of any one of the jaws of a multi-jawed universal chuck relative to the position of the other jaws.

Another object of this invention is to provide an improved multi-jawed chuck wherein the jaws are actuated through a gear train which may be driven by a universal drive means or may be disengaged from the universal drive means and driven by an adjustment device.

An additional object of this invention is to provide an improved jaw mounting in a universal chuck.

A further object of this invention is to provide graduation means for determining the amount of adjustment which has been made in one of the jaws of a multi-jawed universal chuck.

Other objects and advantages of this invention will be apparent from the following detailed description taken in connection with the accompanying drawings, which disclose, by way of example, the principle of this invention and the best mode which has been contemplated of applying that principle.

In general, this invention contemplates providing an adjustment means for independently adjusting any selected jaw of a universal multi-jawed chuck. The universal movement of the chuck jaws is accomplished by driving a ring gear which in turn is in mesh with a gear train attached to a screw and nut actuator for each jaw. For independently adjusting any jaw, a gear of the gear train is disengaged from the driving ring gear and another gear of the gear train may simultaneously be turned to provide the independent adjustment of one jaw relative to the others.

Figure 1:
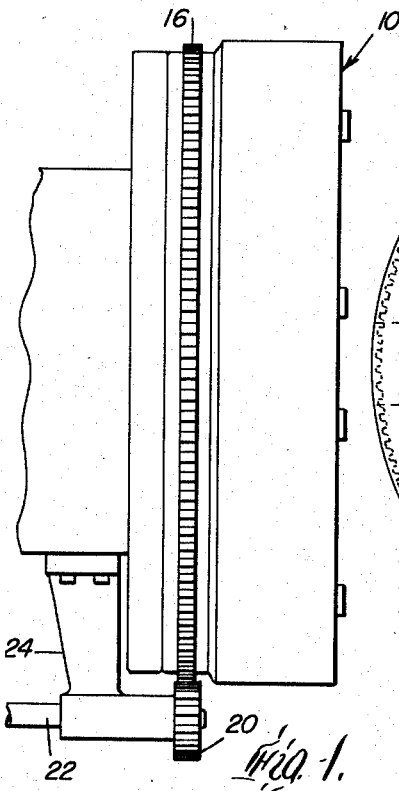
Fig. 1 is a side elevation view of the multi-jawed universal chuck of this invention.
Figure 2:
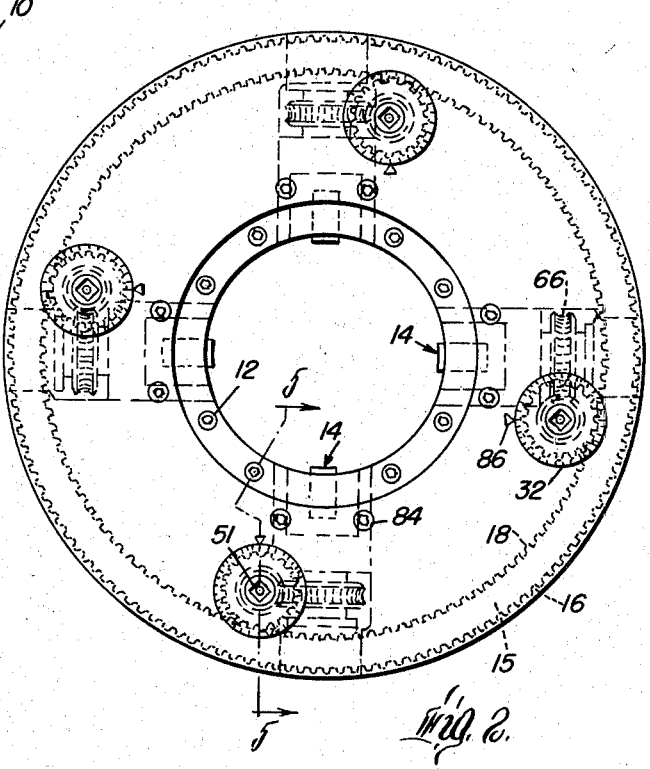
Fig. 2 is a front elevation view.

Referring to the drawings, in Figs. 1 and 2 the chuck is indicated by reference numeral 10. This chuck is attached to a chuck support 11 by means of screws 12 passing through suitable holes in chuck body 13, Fig. 5. A plurality of chuck jaws 14 are adapted to be simultaneously actuated by means of an annular ring gear 15. This ring gear has teeth 16 on its outer periphery thereof and teeth 18 on its inner periphery. A drive pinion 20 is in mesh with the teeth 16 on the outer periphery of ring gear 15. This drive pinion is secured to a drive shaft 22 suitably journaled in a shaft hanger 24 and driven by any suitable means, not shown.

Figure 5:
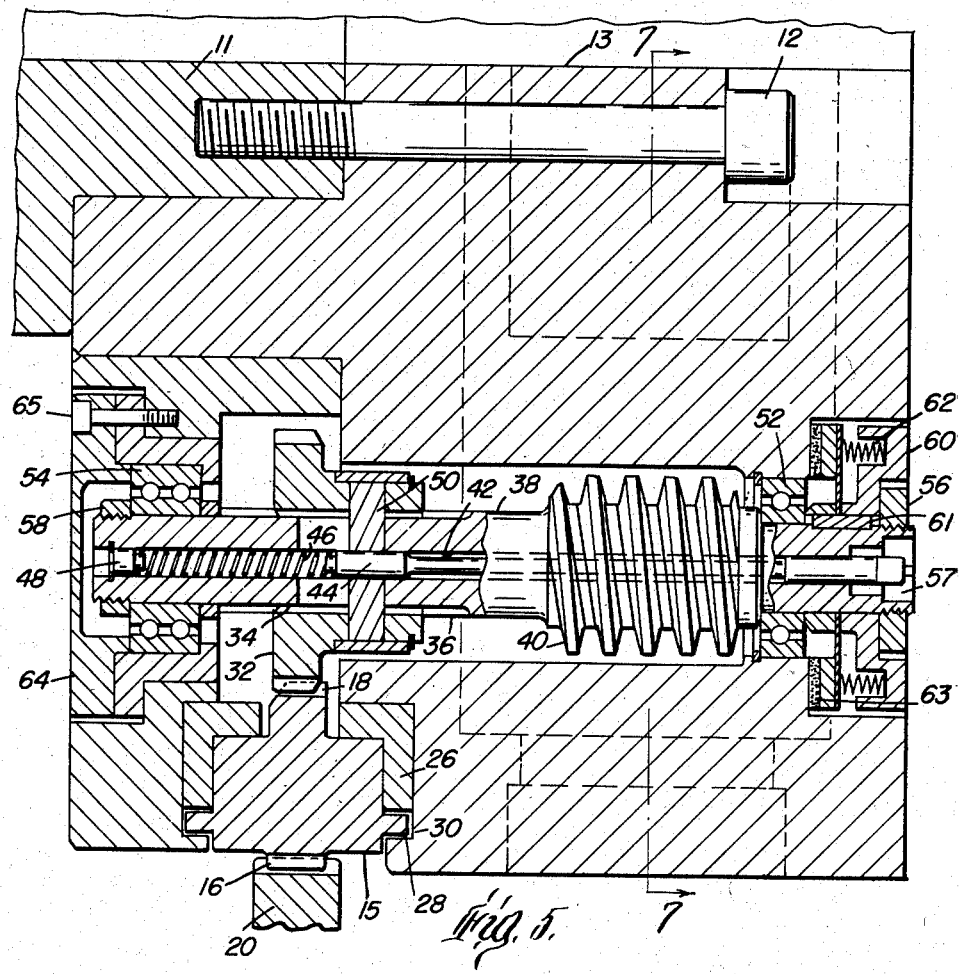
Fig. 5 is a sectional view taken along line 5—5 of Fig. 2.

Referring to Fig. 5, ring gear 15 is journaled in annular channel shaped bushings 26 which together with chuck body 13 form a trackway 30 for flanges 28 extending from the sides of the ring gear body. A gear 32 is in mesh with the inner teeth 18 on ring gear 15. Gear 32 is internally splined at 34 for mating engagement with spline 36 on a rotatable shaft 38. Shaft 38 also carries an integral worm gear 40 and has an axial bore 42 for receiving a slidably movable rod 44 therein. This rod is biased to the position shown in Fig. 5 by a spring 46 acting between one end thereof and a cap 48 positioned in one end of bore 42. A connecting member 50 is secured to the gear 32 and to the rod 44 whereby axial movement of the rod will also move gear 32. The rotatable shaft 38 is provided with a socket head 51 at the face of the chuck for adjusting the jaws, as will be hereinafter described. Rotatable shaft 38 is suitably journaled by anti-friction bearings 52 and 54 and is prevented from axial movement by lock nut 58 and truing dial lock nut 56 having holes 57 therein for actuation by a suitable spanner.

Figure 4:
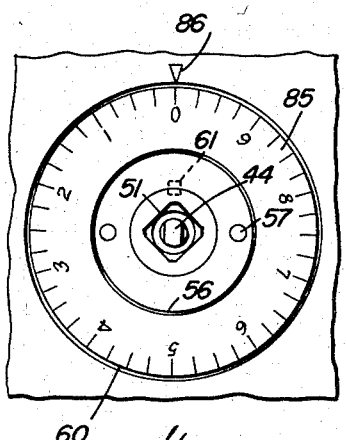
Fig. 4 is a fragmental detail view of the jaw adjustment indicator for one of the clamping jaws.

As shown in Figs. 4 and 5, a jaw truing dial 60 is keyed by key 61 to rotatable shaft 38. A plurality of suitable springs 62 positioned behind the face of jaw truing dial 60 bias a suitable dust seal 63 against a shoulder of the chuck body 13. At the opposite end of shaft 38, a cap assembly 64 is secured by suitable screw means 65 to the chuck body 13.

Figure 3:
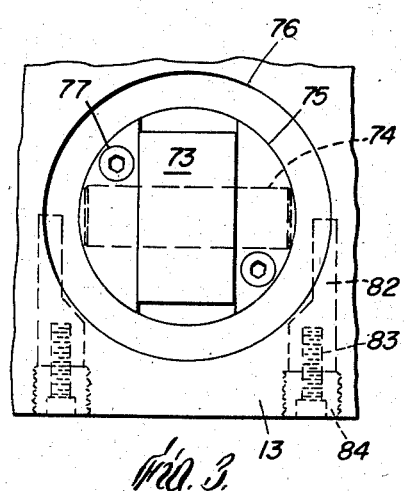
Fig. 3 is a fragmental plan view looking at the end of one of the clamping jaws.
Figure 7:
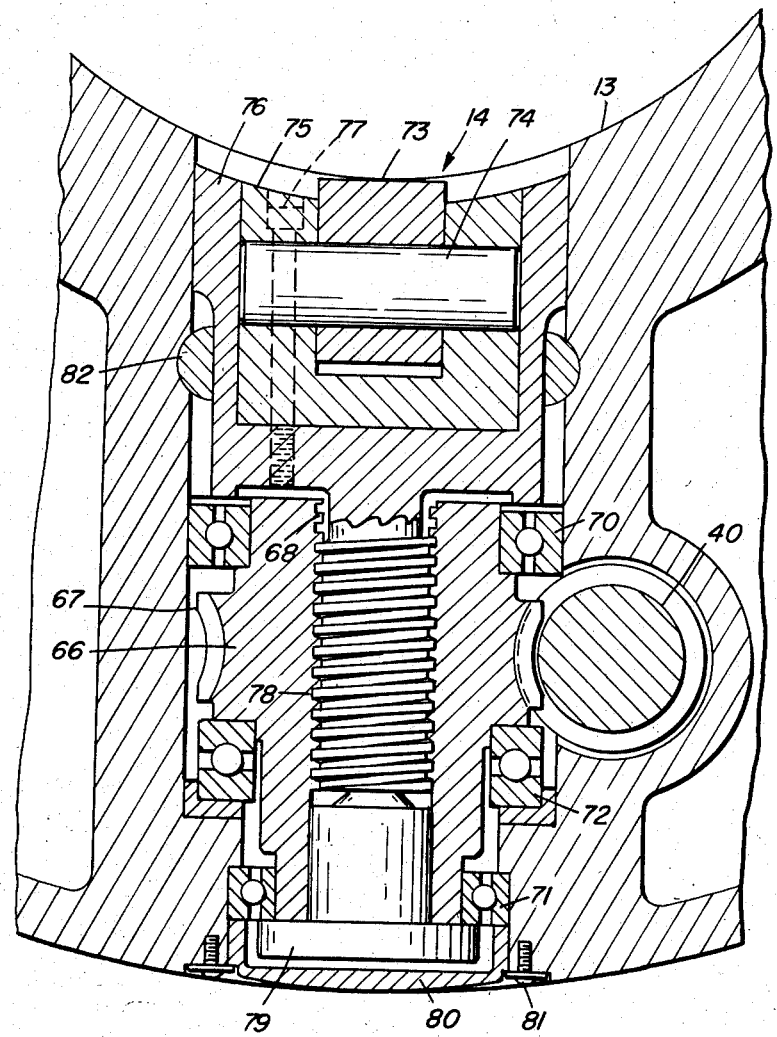
Fig. 7 is a sectional view taken along line 7—7 of Fig. 5.

The individual jaws 14 are actuated by a screw and nut type actuator driven by the worm 40 on rotatable shaft 38. The nut portion of the actuator is indicated by reference numeral 66, Fig. 7, and this nut has gear teeth 67 on the periphery thereof for engaging the worm 40. The nut 66 is internally threaded at 68 for engagement with the screw actuator, and is rotatably supported by suitable anti-friction bearings 70, 71 and 72. The jaws 14 include a workpiece engaging member 73 pivotally mounted in member 75 by a rotatable pin 74 as shown in Figs. 3 and 7. A cup-shaped member 76 having a screw threaded rod extension 78 carries the members 73 and 75 and member 75 is rigidly secured thereto by suitable screws 77. A jaw stop 79 is provided below the threaded extension 78 to limit the outward movement of jaw 14. A cap 80 is secured to the chuck body 13 by suitable screw means 81. The cup-shaped jaw carrying member 76 is prevented from rotating with the rotation of nut 66 by means of guide pins 82 attached by screw means 83 threaded within plugs 84 which in turn are threaded into the housing 13, as shown in Fig. 3. These guide pins 82 cooperate with a flat on the periphery of member 76.

Referring to Fig. 4, a truing dial 60 is provided with graduations 85 on the face thereof which cooperate with a fiducial mark 86 to determine the amount of adjustment of any adjusted jaw relative to the other jaws.

Figure 6:
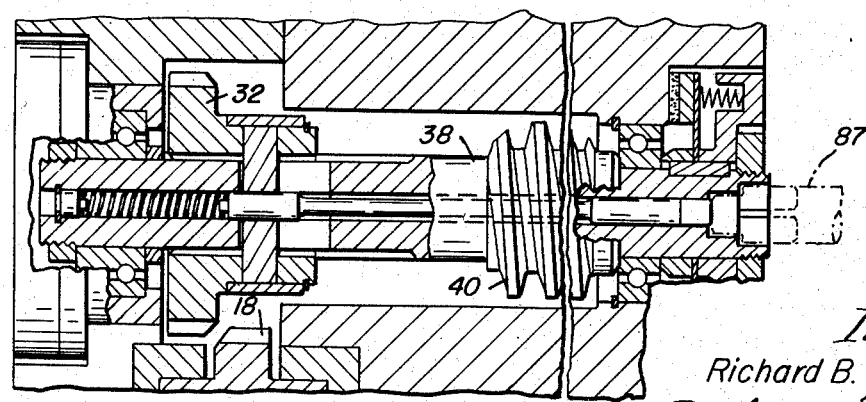
Fig. 6 is a fragmental sectional view similar to Fig. 5 but showing the parts while being adjusted by an adjusting tool.

As shown in Fig. 6, an adjusting tool 87 may be applied to simultaneously disengage gear 32 and engage within socket head 51 for turning the worm 40 and adjusting the corresponding jaw 14.

A typical sequence of operations utilizing this chuck would be as follows: The rough workpiece would be clamped in the chuck with all four jaws universally operating, and with a dial indicator an operator could ascertain very easily whether or not the workpiece was running properly in relation to the axis of the chuck body and a machine tool splindle. If the workpiece was running off-center the operator could note the high and low side and make a proper quantitative adjustment of the appropriate jaw or jaws, usually jaws.

As can be seen, the universal drive for the chuck jaws 14 is from drive pinion 20 through ring gear 15, gear 32, worm 40, nut 66 to the individual jaws 14. Since the ring gear 15 is in engagement with the gear 32 for each jaw 14 the adjustment of the jaws 14 will occur simultaneously. When it is desired to make an adjustment of one or more of the jaws 14 relative to the others for the reasons described above, an operator will insert an adjusting tool 87 into the socket head 51 of shaft 38 as shown in Fig. 6, thereby disengaging gear 32 from the ring gear 15, and by turning the adjusting tool 87 the drive for the individual jaw only is through the adjusting tool 87, worm 40, nut 66 to the selected jaw 14. The amount of this adjustment can be determined by the graduations 85 on the face of the truing dial 60. When the adjustment is complete spring 46 returns gear 32 to its original position in mesh with ring gear 15.

The chuck of this invention is extremely useful when working with very large workpieces and proper centering of the workpiece by the mechanism described above will guarantee that the work will properly "cleanup" in a grinding or turning operation.

While there has been shown and described and pointed out the fundamental novel features of the invention as applied to the preferred embodiment, it will be understood that various omissions and substitutions and changes in form and details of the device illustrated and in its operation may be made by those skilled in the art without departing from the spirit of the invention. It is the intention, therefore, to be limited only by the scope of the appended claims.

What is claimed is:

1. A universal chuck comprising; a chuck body, a plurality of chuck jaws mounted in said body and movable toward and away from a rotational axis, drive means connected to each of said jaws for simultaneously driving said jaws to accomplish said movements, a gear member slidably disengageable from the drive means and a shaft rotatable with said gear member which may be turned to provide adjustment of the corresponding chuck jaw independent of the drive means.

2. A device as defined in claim 1 further comprising biasing means for returning the gear into engagement with the drive means after said independent adjustment is accomplished.

3. A device as defined in claim 1 further comprising a graduated dial attached to said rotatable shaft and cooperating with a fiducial mark on said chuck body to indicate the adjustment of said chuck jaw.

4. A multi-jawed universal chuck comprising; a chuck body, a plurality of chuck jaws slidably mounted in said chuck body for universal movement toward and away from the axis of rotation of said chuck body, a ring gear rotatably journaled in said chuck body, a worm shaft having a gear slidably and non-rotatably mounted thereon in mesh with said ring gear, a slidable member attached to said gear for sliding said gear out of engagement with said ring gear, a spring normally biasing said gear into engagement with said ring gear, a nut member having gear teeth on the outside thereof in mesh with said worm gear, said nut member being internally threaded to engage a threaded extension on said movable jaw, whereby when said ring gear is rotated said jaw will be moved through the intermediary of the gear, the worm, the nut member and the threaded extension on the jaw and the jaw may be adjusted independently when said gear is disengaged from said ring gear and said worm shaft is rotated.

5. A device as defined in claim 4 further comprising an adjusting dial attached to the worm shaft.

6. A device as defined in claim 5 wherein each of said chuck jaws further comprises a work engaging member pivotally attached to a slidable member having said threaded extension thereon for engagement with said nut, and guide means for preventing said slidable member from rotating when said nut is rotated.

References Cited in the file of this patent

UNITED STATES PATENTS

| | | |
|---|---|---|
| 1,713,803 | Whiton | May 21, 1929 |
| 2,245,384 | Bullard | June 10, 1951 |
| 2,822,179 | Barwinkel | Feb. 4, 1958 |
| 2,822,180 | Hollis | Feb. 4, 1958 |